United States Patent [19]

Granholm et al.

[11] 4,298,792
[45] Nov. 3, 1981

[54] LOCKING APPARATUS FOR PREVENTING UNAUTHORIZED ACCESS

[75] Inventors: Carl Granholm, Hastings on Hudson, N.Y.; Rudi Faude, Balingen, Fed. Rep. of Germany

[73] Assignee: BSG-Schalttechnik GmbH & Co., K.G., Balingen, Fed. Rep. of Germany

[21] Appl. No.: 963,054

[22] Filed: Nov. 22, 1978

Related U.S. Application Data

[63] Continuation-in-part of Ser. No. 952,516, Oct. 18, 1978, Pat. No. 4,237,375.

[30] Foreign Application Priority Data

Nov. 22, 1977 [DE] Fed. Rep. of Germany ....... 2752106
Oct. 5, 1978 [DE] Fed. Rep. of Germany ....... 2843359

[51] Int. Cl.³ .............. G06F 15/20; B60R 25/00; G06K 19/06; G06K 7/016
[52] U.S. Cl. .................... 235/375; 235/491; 235/474; 235/458; 340/63
[58] Field of Search ............. 235/491, 466, 468, 462, 235/482, 487, 458, 437, 474, 489; 250/566; 340/274 C, 149 R, 149 A, 147 MD; 200/46; 361/171, 172; 70/271, DIG. 51

[56] References Cited

U.S. PATENT DOCUMENTS

| | | | |
|---|---|---|---|
| 3,310,658 | 3/1967 | Ryer | 235/466 |
| 3,453,419 | 7/1969 | Torrey | 235/466 |
| 3,536,894 | 10/1970 | Travioli | 235/468 |
| 3,562,494 | 2/1971 | Schmidt | 235/466 |
| 3,634,880 | 1/1972 | Hawkins | 340/63 |
| 3,688,269 | 8/1972 | Miller | 340/149 R |
| 3,829,662 | 8/1974 | Furahashi | 340/149 A |
| 3,845,362 | 10/1974 | Roe | 70/DIG. 51 |
| 3,852,572 | 12/1974 | Nicoud | 235/489 |
| 3,858,032 | 12/1974 | Scantlin | 235/487 |
| 3,906,447 | 9/1975 | Crafton | 340/149 A |
| 3,976,857 | 8/1976 | Hogberg | 250/566 |
| 4,050,063 | 9/1977 | Schull | 340/274 C |
| 4,090,175 | 5/1978 | Hart | 340/149 A |
| 4,144,523 | 3/1979 | Kaplit | 340/149 R |

*Primary Examiner*—Robert M. Kilgore
*Attorney, Agent, or Firm*—Edwin E. Greigg

[57] ABSTRACT

An apparatus for actuating a locking device, security system and the like and for arming and disarming associated alarm systems. The apparatus includes an information carrier, preferably carrying a digitally coded set of data which is presented to a reading device by manual insertion of the data carrier. The data carrier may be a key-like object on which the data track occupies the central tang portion or it may be an actual mechanical key used to operate a tumbler cylinder and additionally provided with a central data track. Preferably, the data track is a series of transparent and opaque fields which are subjected to infrared radiation in the reading device. The read-out data from the data track is compared in the apparatus with stored information and, when coincidence occurs, an actuation signal is generated to operate the associated locking system and/or alarm system. The apparatus includes a program memory which contains stored information regarding the clock cycle to be expected and is thus able to read out the information contained on the data carrier without automatic mechanical transporting devices for passing the data carrier past the reading assemblies. The apparatus also provides the read-out and status determination during standby operation with low power sensing pulses and a switchover to data read-out in the presence of the data carrier with high-powered pulses of a current density which exceeds that normally acceptable to the light sources under continuous operation. In a preferred embodiment, the coded information on the data carrier is so distributed that, during the read-out of these data, a local clock sequence is generated automatically from the data per se without the requirement for a separate timing track.

30 Claims, 14 Drawing Figures

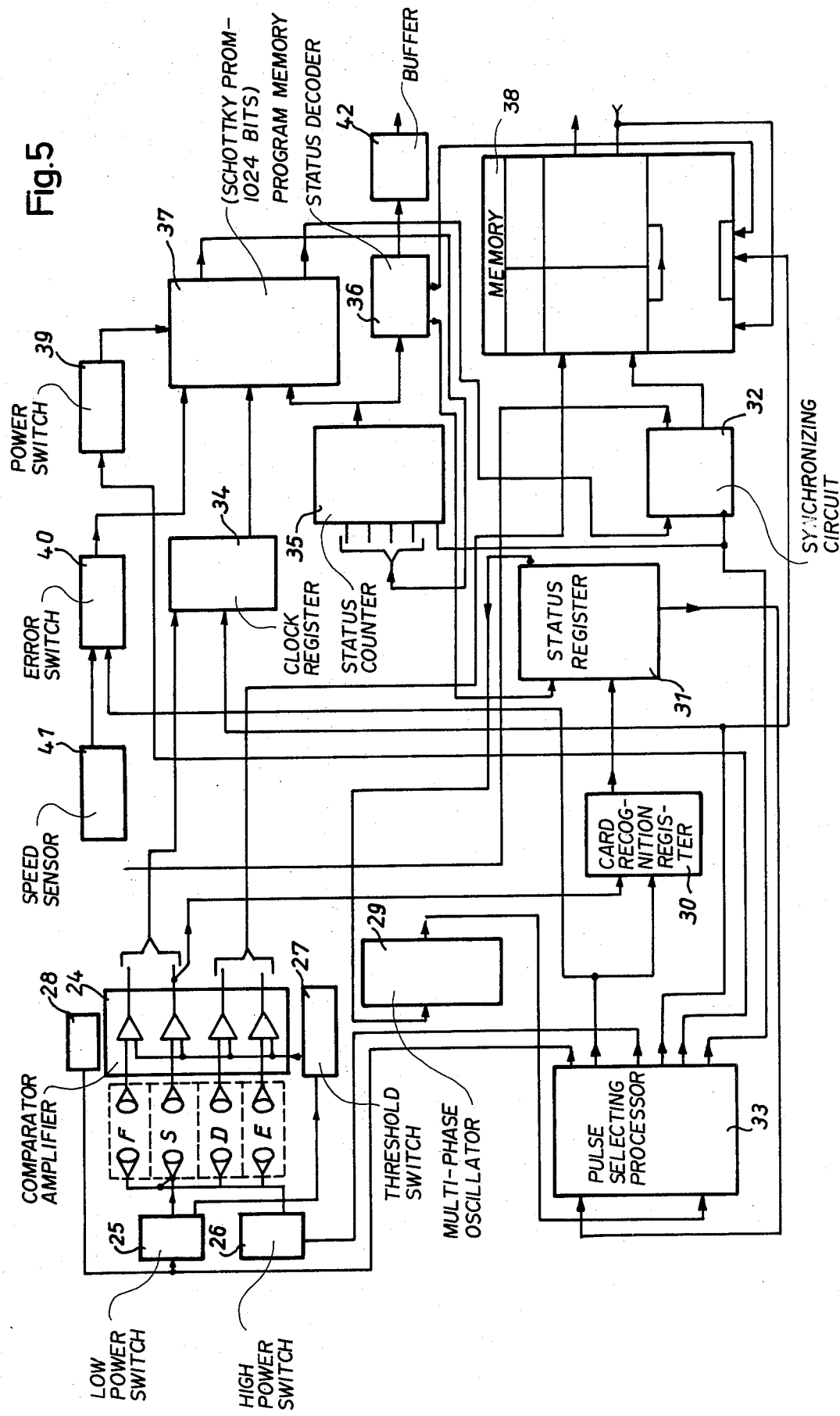

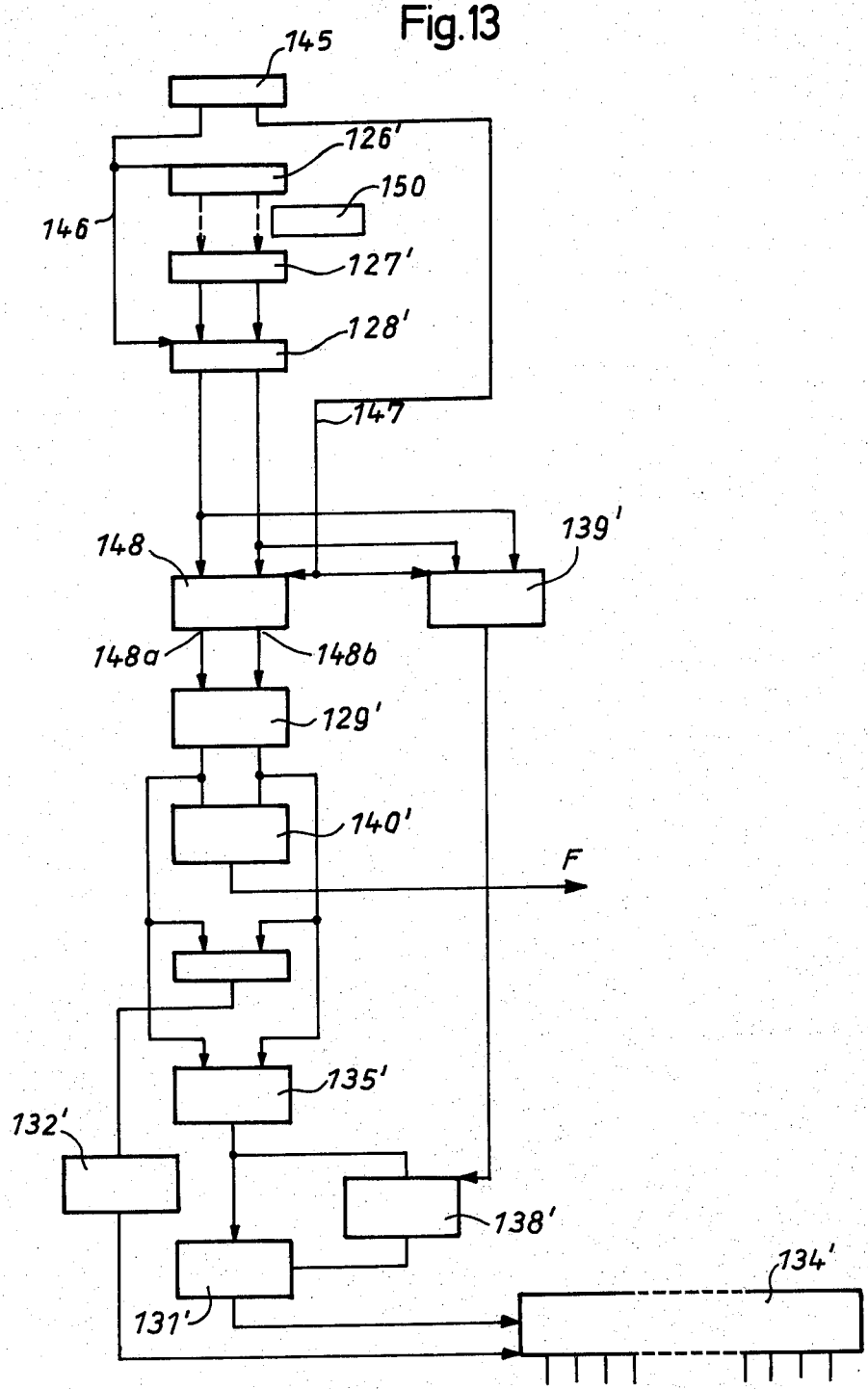

LOCKING APPARATUS FOR PREVENTING UNAUTHORIZED ACCESS

CROSS REFERENCE TO RELATED APPLICATIONS

U.S. Pat. application Ser. No. 952,516, inventor Carl Granholm, filed on Oct. 18, 1978, now U.S. Pat. No. 4,237,375, of which the present application is a Continuation-in-Part.

FIELD OF THE INVENTION

The invention relates to an apparatus to be used in association with locks, safety interlock devices, and in general to devices preventing unauthorized access to buildings, rooms, automobiles, etc. At the same time, the invention relates to the enabling and disabling of alarm systems which signal the unauthorized entry of persons to the secured areas. More particularly, the invention relates to a lock in which sensors and light sources are disposed between which a coded key can be inserted. The sequence of light signals so obtained generates a code which may be tested with respect to its identity for the purpose of providing access to secured installations.

BACKGROUND OF THE INVENTION

It is known in the art to provide highly complicated lock and access-preventing systems in buildings, rooms and automobiles which are closed by doors or other means so as to prevent the unauthorized access to such installations to prevent theft and other undesirable activities. The commonly used tumbler locks permit a large variety of key combinations, for example five thousand different combinations, which would normally make it extremely unlikely that the wrong key will accidentally open a lock for which it was not intended. Moreover, the installations, automobiles, buildings, etc. may then be separately secured by the installation of alarm systems which may signal any unauthorized entry or tampering which bypasses the lock/key system. These alarm installations are known in a large variety of designs and embodiments. Normally, these alarm systems are enabled or disabled separately from the operation which unlocks the mechanical lock on the doors, etc. For example, in motor vehicles, the removal of the ignition key and the closure of the driver's door may initiate a timed process which sets the alarm after a period of time has elapsed. In alarm systems used in buildings and the like, a separate key and lock system is normally used to set the alarm.

In spite of these precautions, it has been found, in fact, that even very complicated lock and key systems, for example the commonly used tumbler locks, cannot prevent unauthorized entry into the protected areas or unauthorized possession of secured objects. For example, the tumbler cylinder locks have often been defeated by the insertion of a deformable element which detects the pin configuration in the tumbler lock so that the person using this detector may have a duplicate key made which may be used immediately or at some opportune future time to gain access to the protected facility.

The alarm systems intended to protect the installation cannot afford protection against this type of circumvention because their existence is often known to the unauthorized party and they may be disabled rapidly. Even if they sound the alarm, which normally is a loud noise, the unauthorized party often will accept the risk of such an alarm. Yet again, the correct key may make it possible to turn off the alarm prior to its sounding. Similar considerations apply to various other localities and systems which protect buildings, rooms and objects by means of locks and the like. In the field of motor vehicles it has been shown by statistics that no apparent solution has been found for preventing the theft of, especially, expensive models of motor vehicles.

In alarm systems used in buildings and rooms which require the use of two separate keys, it is possible to insert the wrong key into the alarm system, causing the system to respond and sound a false alarm. If such false alarms occur with regularity, there is a tendency of the concerned person to become habituated to the occurrence of false alarms and this habit will tend to prevent a proper response in the event of a real alarm. All of these facts imply the need for an absolutely secure and trouble-free alarm system which can be set and disabled by the authorized party without concentrated attention and without triggering a false alarm.

OBJECT AND SUMMARY OF THE INVENTION

It is a principal object of the present invention to provide a security locking system which employs an information carrier that locks and unlocks the secured facility and which cannot be readily duplicated. It is an associated object of the present invention to provide a security lock system which cannot be actuated except by the insertion of the proper information carrying element. Still another object of the invention is to prevent the possibility of obtaining the correct code for unlocking the system from the lock alone. Yet another object of the present invention is to provide a locking system in which the information carrier makes no mechanical interactive contact with the lock for the purpose of disengaging the locking system.

It is a feature of the present invention that the unlocking code is not stored in the immediate vicinity of the point at which the information carrier is introduced, thereby preventing any access thereto. Still another object of the invention is to provide a lock system having a code which permits different code permutations which are several orders of magnitude higher than is possible with lock and tumbler systems. These and other objects are attained according to the present invention by providing an actuator element (information carrier, key) and wherein the actuator element carries a non-mechanical coded track. The counter element, (lock) contains sensors which interact with the code on the track in non-contact fashion and generate an output signal which is fed to a memory that contains the correct information for unlocking the system. The contactless detection of the correct data combination opening the lock makes it possible to combine the lock system with an alarm system very easily because the signal used for unlocking the lock may also be used to set or disable the alarm system. As a consequence, the apparatus of the invention requires only a single actuator element or key to perform all the necessary steps which are required to secure the installation.

It is possible however to operate the lock mechanically and to use a non-mechanical coded actuator element for setting and disabling only the alarm system.

It is an advantageous feature of the present invention that the actual correct combination of data which will open the lock is absolutely inaccessible to anyone on the basis of tampering with the opening in the lock or its vicinity. That area of the lock contains only the sensors which do not have the information required to open the lock. That information is contained in a memory, for example a digital PROM, which is located at a point which is unknown and inaccessible to the tampering party. The sensors located within the lock only provide signals and are otherwise passive. The features of the invention thus provide an absolute and inexpensive protection against the increasing occurrences of unauthorized entry into or usage of installations, motor vehicles, objects and buildings in which an alarm system may simultaneously be present. As a result, unauthorized entry or theft and usage could take place only at a highly increased risk or by brute force, for example with the use of crowbars in order to gain access to an automobile. However, such forcible entry will always trigger the alarm system and will also cause substantial damage to the object itself which may be assumed to be undesirable to the unauthorized party.

It is a favorable feature of the invention that the process for reading the coded information on the actuator takes place by a relative displacement of the actuator (information carrier) and the sensors located within the lock. The number of bits which serve as the information carrier is practically unlimited due to the location of the memory in a central position. For example, if a memory of 16 bits is used, the total number of possible combinations exceeds 60,000 and this number is doubled for a binary coded system for each additional bit. There is no difficulty in practice to imprint, or otherwise place, 16 different bits on a particular actuator element. It has been found to be particularly advantageous if the coded information is present on the actuator element in a form which permits interrogation by means of electromagnetic radiation, for example by means of light. A particularly favorable form of radiation has been shown to be infrared light. When the system is based on the detection of infrared light, the sensor is an infrared light-emitting diode (LED) associated with a suitable detector, for example a phototransistor. The phototransistor is connected to a processor circuit which may contain amplifiers, pulse shapers and the like, and which actuates a counter, preferably an up/down counter. This type of construction permits a dynamic input of signal information and a release of the lock or corresponding actuation once the actuator element has fully passed the sensors. In a particular case, the coded track may be disposed along the longitudinal extent of a key-like element, for example as a central track on a key, in which the information is present in the form of alternating light and dark bit locations. When the "key" is inserted into the "lock", the passage of the coded track generates a sequence of signals which is compared with a stored set of data. When the counter is embodied as an up/down counter, it is possible to read the information on the actuating element directly, irrespective of the speed of insertion and even irrespective of short term retrograde motions.

A further advantage of the apparatus according to the invention is the absence of a mechanical, and therefore complicated key transport mechanism which automatically pulls the actuating element past sensing devices. Such mechanisms are always subject to malfunction which is prevented in the present apparatus. Accordingly, a relatively simple and reliable reader is obtained.

It is a still further advantage of the present invention that the apparatus can be used in pulsed operation both during standby and during actual reading. Inasmuch as no coordination is expected or takes place between the insertion speed of the information carrier and the clocked operation in the pulsed mode, no errors can occur because various circuit elements enter a standby mode or operate in a loop mode.

The invention will be better understood as well as further objects and advantages become more apparent from the ensuing detailed description of preferred embodiments taken in conjunction with the drawing.

BRIEF DESCRIPTION OF THE DRAWING

FIG. 5 is a block diagram of a first embodiment of the apparatus of the invention;

FIG. 13 is a block circuit diagram of a second embodiment of a processor circuit associated with the information carrier of FIG. 11 but suitable for pulsed operation.

DETAILED DESCRIPTION OF THE PREFERRED EMBODIMENTS

The basic information carrier on which the coded information to be used for unlocking the security system is placed will be referred to hereinafter as an actuator element or even simply as a key. It is the principal notion of the present invention to impart to this key coded information which can then be read by a reading assembly or sensor. The reading operation takes place without mechanical contact between the key and the reading assembly. Furthermore, the information present on the key or actuator element is preferably not visible to the human eye.

Hereinafter, the invention will be discussed most generally with respect to an apparatus for the purpose of protecting and securing motor vehicles. However, it will be understood that the field of application of the present invention is substantially broader and extends quite generally to the protection and security of buildings, factories, installations, objects or systems which are closable by means of doors or covers or which are secured, for example, by chains and padlocks. In all of these systems, a separate source of energy, most generally an electrical current source, will be present, accessible or at least connectable.

Figures 1A, 1B, 2:
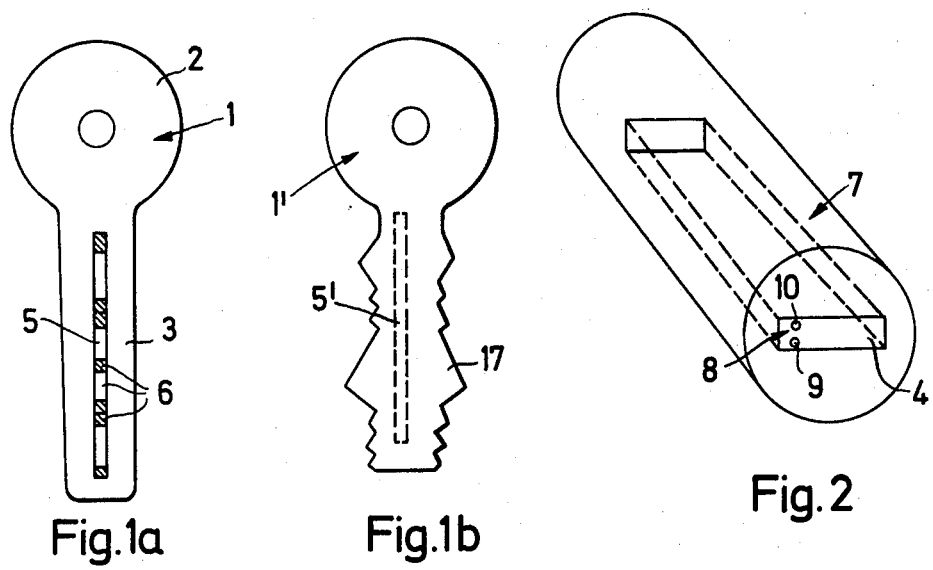
FIG. 1a is schematic illustration of an information carrier or key having no mechanical actuation features.
FIG. 1b is an actuation element or information carrier whose construction resembles that of an ordinary mechanical key and in which a central code track is disposed.
FIG. 2 is a schematic diagram of a receiver assembly resembling an ordinary lock cylinder and serving to act as the receiver for the actuator element of FIGS. 1a and 1b.

Turning now to FIG. 1, there will be seen illustrated in illustration 1a a key-like actuation element, including an enlarged surface 2 for handling and an elongation 3 which, as is the custom with ordinary keys, is to be placed in a receiver aperture 4 of an associated receiver illustrated in FIG. 2 and which may have the form of a common lock cylinder. The extension 3 of the actuation element 1 in FIG. 1 carries at least one coded track 5 which may contain information, for example, in binary coded form. In the simplest case, the key carries only a single code track composed of alternating light and dark fields 6. The exact form of the marking in the track is not critical to the present invention. The principal requirement is that the track should cause a suitable reaction when passed in the vicinity of the sensors within the receiver 7. For example, the markings in the track need not be totally transparent, they could also be more or less shaded. In the illustrated example, the sensor 8 responds to light, more particularly to infrared light. The sensor assembly includes an infrared emitting element 9, for example an infrared emitting diode, associated with a receiver 10 which responds to light in the same spectral region, for example a phototransistor. When the extension 3 of the key 1 which carries the coded track 5 passes the sensor 8, the sensor assembly responds to the alternating light/dark field in the coded track, for example by registering the number of dark fields. The region in which the coded track is laid down on the key 1 is so constructed as to be substantially transparent to infrared radiation, i.e., the sensor 8 recognizes the information contained in the coded track. However, this information is so placed in the track as to be invisible to the human eye and may not even be identified by mere manipulation under infrared light. In this manner, even a short term theft of the correct key 1 would not suffice to obtain the information required to open the lock. Furthermore, such a procedure would seem improbable inasmuch as a purloined key could be used directly to open the lock. The coded track 5 may be placed in a region made of a suitable synthetic material, or, as in the case of FIG. 1a, the entire key may be made of a plastic material or some other suitable material, for example aluminum or the like. The key illustrated in FIG. 1a is not required to do any mechanical work but acts only as an information carrier for the coded track 5. The speed with which the key is inserted into the slot 4 of the receiver is not critical inasmuch as the sensor recognizes only the distribution of light/dark fields and generates pulses for a subsequent processing circuit. The subsequent circuitry may be so embodied and the coding 5 on the key may be so designed that, even when the insertion of the key is temporarily halted or the key is pulled back a short distance, the renewed insertion of the key does not impede the correct reading of the data.

Figure 3:
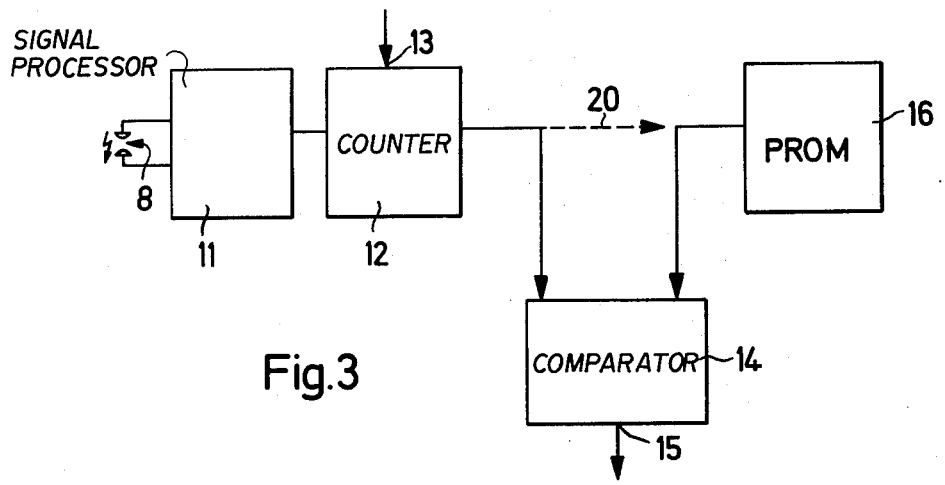
FIG. 3 is a block diagram of a circuit for receiving and processing the signals generated by the sensors in the receiver of FIG. 2.

The reading of the data, as will be seen from the illustration of FIG. 3, takes place for example by connecting to the sensor 8 a suitable processing circuit 11 containing, for example, amplifiers, pulse shapers, decoders, etc., which feed an up/down counter 12. Any reverse, i.e., outward, motion of the key within the guide slot 4 may be recognized by suitable and known apparatus and such an event may be signaled to a up/-down control input 13 within the counter 12 so that any unintentional partial withdrawal of the key during insertion would subtract the previously counted marks from the total counter content so that any renewed insertion would still register the correct number of coded bits.

In an especially simple exemplary embodiment, only a single coded track 5 is provided with a substantial number of sequential light/dark fields, for example, 16 fields corresponding to 16 bits, resulting in a total number of 65,536 lock combinations. The sensor 8 applies to the counter 12 only a counting pulse train which terminates when the key is fully inserted, as signaled by an "end of insertion" signal, and the counter contents may be transmitted in serial or parallel manner to a subsequent comparator 14. The comparator 14 compares the number obtained from the counter 12 with a number supplied by a separate memory, for example a programmable, read-only memory (PROM) 16. If these two numbers are equal, which will be the case if the proper key 1 is inserted, the comparator 14 may generate an output signal 15 which unlocks the system and designates the test as having been concluded satisfactorily. In the application to a motor vehicle, the signal 15 is used to open the doors of the vehicle. Advantageously the above-described system may be used in conjunction with door-locking mechanisms in vehicles which include a central locking feature. When the release signal occurs at the output of the comparator 14, the central door locking system of the vehicle may be actuated, for example via an output power stage, so that the doors may be unlocked, for example pneumatically.

In order to prevent reading errors such as may take place for example if the key is repeatedly retracted prior to being fully inserted, so that several light or dark fields may follow one another, the information track may be supplemented by a small narrow region which generates a control pulse. The control pulse alerts the subsequent processing circuit to the imminent arrival of a new code field. The arrival of that field then controls the counting process in the counter 12. Similar measures may be taken for the up and down counting. The distinction between a control pulse and an actual counting pulse may be made by a further counter which counts only the control or clock pulses and which can indicate the termination of the counting process by achieving its full content of, for example, 16 bits.

A particularly favorable application of the present invention is the combination of a key or actuator element as illustrated in FIG. 1a and an alarm system which is armed by the motion of the key 1a and the receiver 7. In that case, the security of the alarm system against tampering is equal to that of the lock itself, i.e., it cannot be disarmed or disabled by anyone not in possession of the key.

In such a combined application, the alarm system may be armed or disarmed by the "correct" signal generated by the comparator 14 after the completion of a successful comparison. Alternatively, the alarm system may be armed when the door key is removed from the vehicle after closing the door. All these steps are inseparable from the actuation of the lock itself so that they cannot be forgotten and the driver may not even deliberately dispense with the trouble of arming the alarm system. On the other hand, false alarms are completely prevented because the alarm system will respond only to the insertion of the proper key and the entire system may be so designed that the alarm will sound if an attempt is made to open the door with the wrong key.

However, in some types of vehicles or in certain types of buildings and installations or the like, a mechanically configured key may be used for the opening of doors locks and the like while a supplementary coded track 5' is provided in a part of the key, for example the central part of the tang 3. The use of such a system for securing buildings is particularly advantageous because the alarm system may be armed or disarmed by inserting or removing the key in a cylinder lock equipped with a sensor 8. The arming and disarming takes place by conducting, respectively, an opening or closing process by means of the key and with the aid of the circuit 3. However, the "correct" signal from the comparator 14 would now be used for actuating the alarm system. The opening and closing of the cylinder lock or any other suitable lock is performed in the customary manner by the interaction of the serrated edges of the key with appropriate cooperating mechanical elements in the lock.

According to the foregoing, the invention may be used in two different ways, a first way in which a mechanical key is used for operating the lock while the coded information track on the key is used for arming and disarming the alarm system and a second manner of operation in which the locking and unlocking is performed fully electrically with or without simultaneous actuation of the alarm system. Auxiliary forces, for example a pneumatic central locking system, may be employed in performing the actual locking and unlocking of the doors, etc.

If the actuator element, i.e., the key 1', of FIG. 1b is used, the actuation of the alarm system cannot be forgotten and, at the same time, the alarm system cannot be triggered in error by the mistaken use of the wrong key such as often happens when two or more keys are used for securing an installation. It has been discovered that ambitious gangs of thieves actually use persons to obtain employment with manufacturers of luxury automobiles so that the intended larceny will be further facilitated. Such tactics are effectively counteracted by the present invention in an advantageous embodiment in which the entire decoding section including the circuit elements of FIG. 3 is not built with a particular coded combination. In particular, the contents of the PROM 16 are left indeterminate until the vehicle is sold or at some later date. The owner can then place a particular code, possibly unknown to himself, into the PROM 16 for the first time in an initial insertion of the key 1 into the guide slot 4 of the receiver 7. During this first insertion, a first counting process takes place, as indicated in FIG. 3 by a dashed line 20, which results in the permanent storage of that code in the PROM 16. Any subsequent attempt to open the lock with a key whose code is not exactly the same as that which performed the first loading of the memory 16 will result in failure.

Figure 4:
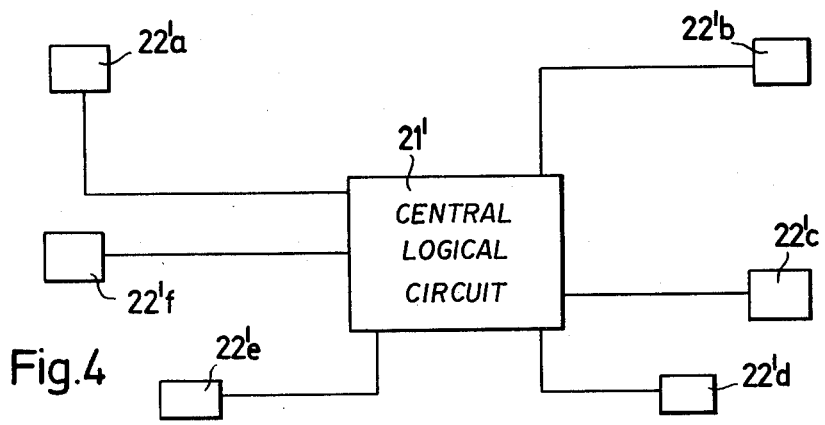
FIG. 4 is a block diagram of an embodiment of a security system according to the invention with a multiplicity of sensors.

The invention is particularly useable for the retrofitting in installations, buildings, etc. which are already equipped with high quality mechanical locking systems. The only changes required would be to exchange the keys for keys such as depicted in the illustration of FIG. 1b and to install a sensor 8 within the key slot of the lock cylinder 7, which is easily possible due to the small size of such parts. If necessary, the lock cylinder may be exchanged. The data detected by the sensor during the insertion of the key are then passed through a suitable connecting line to a central logical circuit 21', illustrated in FIG. 4, whose purpose it is to decide if the correct key carrying the correct coded track has been inserted in the lock. If this test is affirmative, the central logical circuit 21' can disarm the alarm system and/or release the locks on the door and open the same. The actual unlocking of the bolts may be performed by a suitable solenoid or pneumatically. As indicated in FIG. 4, a central logical circuit 21' may be engaged by a multitude of primary external stations 22a-22f, each having sensors 8. Such a system is particularly suitable for large buildings. The central alarm system which serves the entire building can thus be armed or disarmed from any single station so that all doors or accesses to the installation or building may be secured from a single location, thus providing a system which cannot be defeated except by force, in which case the alarm system responds anyway.

It will be appreciated that a system as depicted in FIG. 4 is especially suitable for motor vehicles in which the normally multiple doors are to be secured against unauthorized opening and entry. Each of the doors would then constitute one of the stations 22a-22f, while the central logical circuit 21' would be located within the interior of the vehicle in a suitable location. The required auxiliary energy source, for example electric or pneumatic energy to perform the operation illustrated above would always be present in a motor vehicle.

A preferred exemplary embodiment of the system according to the invention is to place more than one coded track on the key or actuator element and to provide a number of associated reading assemblies or sensors, all of which engage a common counter or each of which has its own counter. In this manner, it is possible to obtain the desired information independently of the insertion speed of the key and without the deposition of, for example, a clocking track, i.e., without any other circuit elements. Furthermore, a plurality of coded tracks substantially increases the number of possible different codes. The overall opto-electronic data-reading device according to the present invention is illustrated in a preferred embodiment of FIG. 5 as a block diagram. This diagram illustrates the overall organizational cooperation and contains the following main components. Each of these components will be shown and discussed in detail in connection with the description of FIGS. 7 and 8.

The reading system illustrated in FIG. 5 is shown in an embodiment including four reading assemblies F, S, D, E, each consisting preferably of a light-emitting diode (LED) acting as a light source and a phototransistor serving as a light receiver. Preferably, both sensor and receiver operate in the infrared region of the spectrum. The outputs of the reading assemblies go to a comparator/amplifier 24, itself controlled by a power switch 28 and engaged by an adjustable threshold generator 27. All of the components are actuated by pulse trains with phase-shifted edges which are selected by a pulse selecting processor 33.

During the reading operation, the four reading assemblies F, S, D, and E are connected to a high power switch 26. At the same time, a photodiode S belonging to one of the reading assemblies is also connected to a low power switch 25 whose output is then applied to an input of the threshold generator 27. In this way, the presence of an information carrier or key within the region of the reading assembly may be detected by means of very weak detector pulses via the reading assembly S after which the full and preferably pulsed reading power is applied. The switches 25 and 26 are connected to separate control outputs of the pulse selection processor 33 and the power switch 28 is connected to the same output of the processor as is the low power switch 25. The apparatus shown in FIG. 5 further includes a multi-phase oscillator 29 which generates a number of pulse trains applied to the processor 33, an information carrier recognition register 30, a status register 31, a synchronizing circuit 32, a clock register 34, a status counter 35, a status decoder 36, a programmable memory 37 for receiving a sequence of pulses, a data memory 38 for accepting the information read from the information carrier, a power switch 39 for the programmable memory 37, an error switch 40 for generating an error signal when the correct information carrier has been inserted in the wrong way or if an incorrect information carrier is being used, a velocity sensor 41 which actuates the error circuit 40 and is itself controlled by an output of the pulse selection processor 33.

Figure 7:
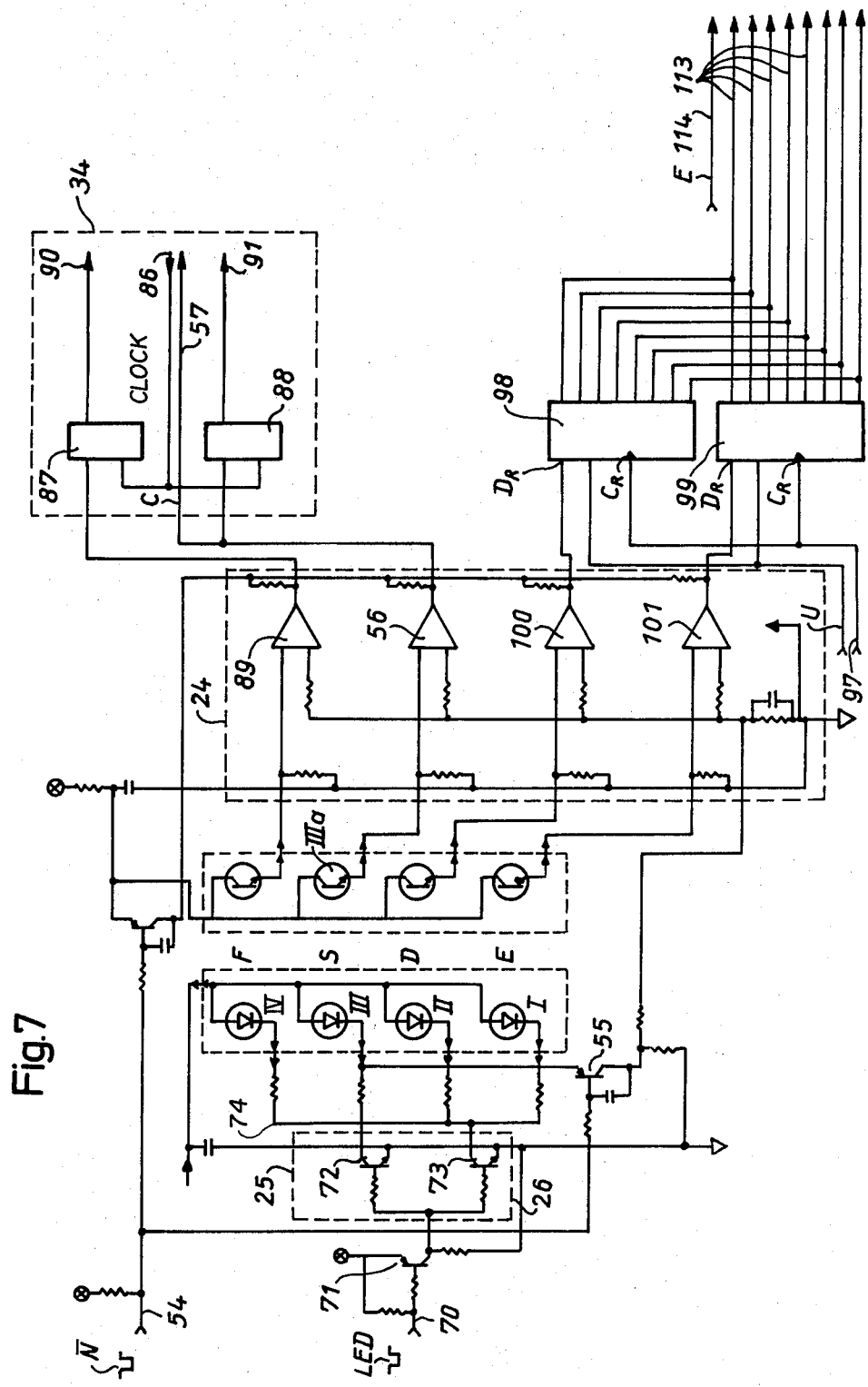
FIG. 7 is a detailed circuit diagram of some of the blocks in the embodiment of FIG. 5.
Figure 8:
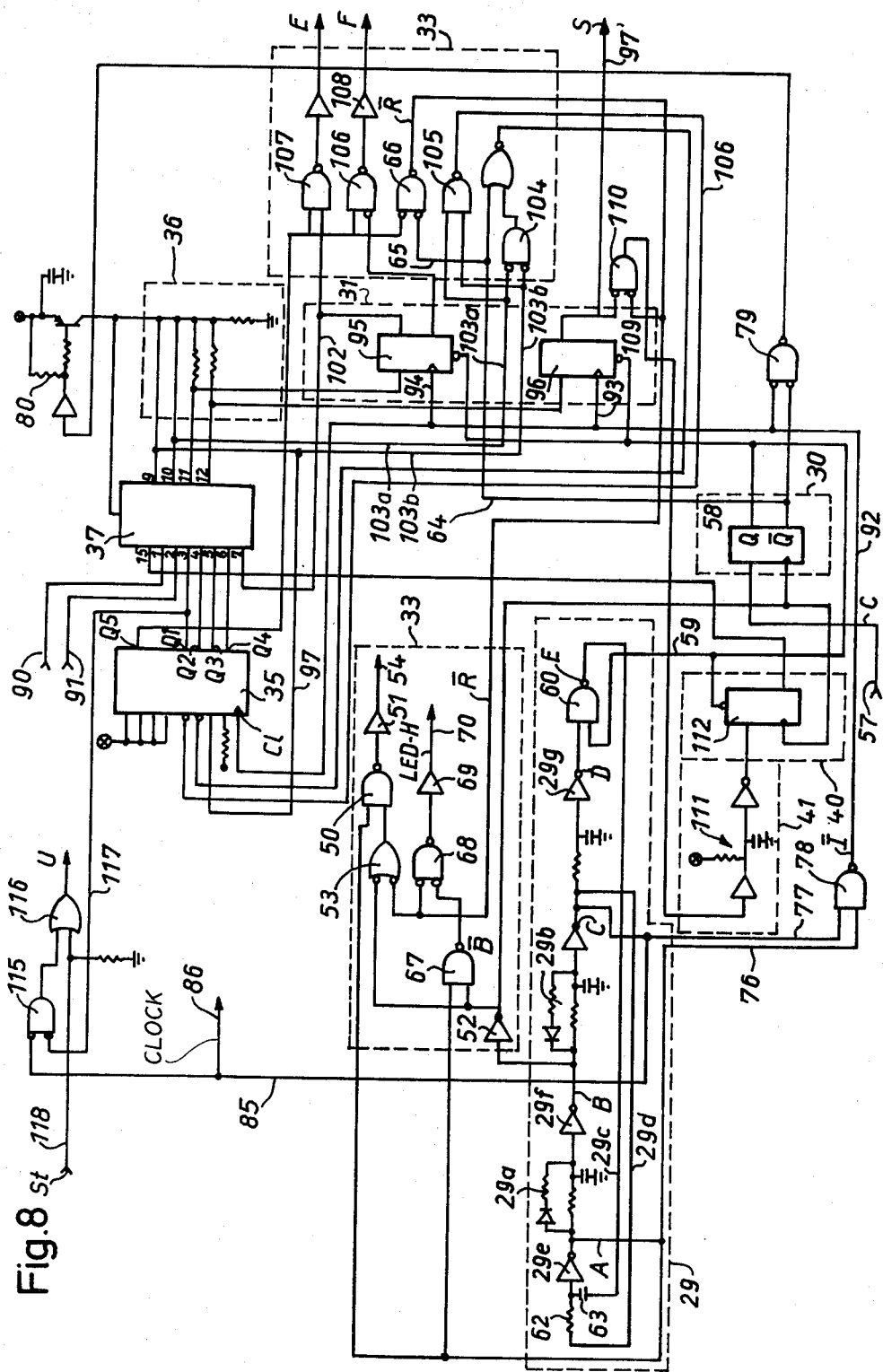
FIG. 8 is a detailed circuit diagram of further circuit blocks of FIG. 5.

The first exemplary embodiment shown in block diagram form in FIG. 5 is illustrated in detail in FIGS. 7 and 8. The system shown relates particularly to a reading mechanism which can be operated in a standby mode by using at least one of the reading assemblies at relatively large time intervals and using relatively short, low-power sensing pulses. The apparatus may also be used in the pulsed mode during the reading operation when all of the reading assemblies receive high-power pulses, i.e., pulses whose amplitudes are substantially greater than the power level which could be used in continuous operation. It should be noted at this point that the apparatus of the invention could also be used with periodic sensing pulses during standby operation but with continuous full power during the reading cycle, provided that the reading heads are constructed so as to permit such operation. However, it is preferred according to the invention to perform a pulsed operation both during standby and during the reading cycle, not only for the reading head assemblies but for the entire system, especially of those circuit groups which consume relatively high power.

Figure 9:
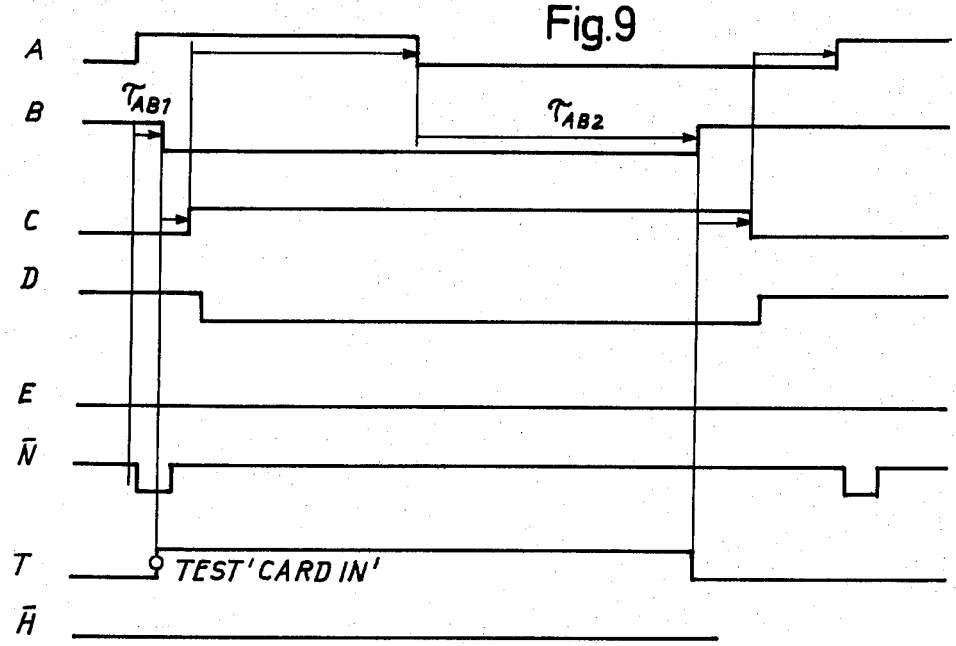
FIG. 9 is a first timing diagram of the pulse trains generated by a multi-phase oscillator in the invention when no information carrier is present.
Figure 10:
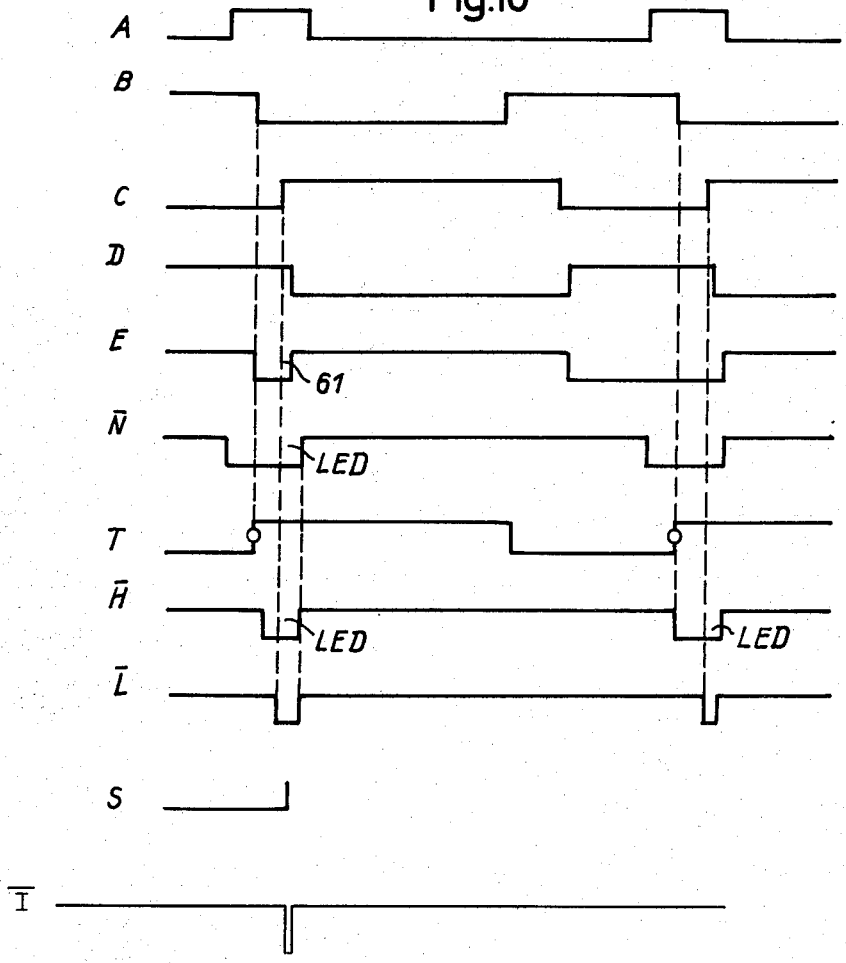
FIG. 10 is a pulse timing diagram similar to that of FIG. 9 when an information carrier is present in the apparatus.

A principle component of the apparatus of the invention is the multi-phase oscillator 29 shown in detail in FIG. 8, which serves to generate the various pulse sequences illustrated in FIGS. 9 and 10 which serve for the selective control and triggering of various circuit elements, for example the pulsed operation of the reading heads, etc., although the pulse trains A, B, C, D and E shown in FIGS. 9 and 10 should be regarded as merely exemplary and subject to change according to particular requirements of a given apparatus. The major component of the multiphase oscillator 29 illustrated in FIG. 8 is a cascade of any desired number of Schmitt triggers, the output of each of which generates a particular one of the previously mentioned pulse trains. These Schmitt triggers are combined with intermediate circuits 29a, 29b containing diodes which serve to cause time delays in the propagation of output pulses from one Schmitt trigger to the next, depending on the sign of the edge of the pulse. In this way, and further due to the presence of the feedback lines 29c and 29d, a large variety of pulse train patterns may be generated. For example, the positive edge of the pulse train A, which is generated at the output of the first Schmitt trigger 29e, rapidly triggers the subsequent Schmitt trigger 29f because the pulse passes quickly through the diode of the sub-circuit 29a, whereas the negative edge of the pulse train A resets the output pulse train B of the Schmitt trigger 29f substantially later. Similar remarks apply to the generation of the pulse train C. The circuit loop is closed for the purpose of generating oscillations via the line 29d. In this manner, there are produced the pulse trains shown in FIG. 9, and these pulse patterns are repeated continuously when at least one of the sensing heads associated with the information carrier determines that no information carrier is present within the region of the reading heads. This determination is made as follows.

Timing Pattern In The Absence Of A Coded Card

As seen in FIG. 8, the B pulse train passes through the inverter 52 and the gate 53 to one input of the gate 50. The gate 50 also receives the pulse train A and the combination of these two pulses causes the generation of a short negative sensing pulse $\overline{N}$ at the point 54 which is applied to the input of a transistor 55, shown in FIG. 7, which causes the activation of a selected light-emitting diode III associated with the reading head assembly S. The presence of a card in the reading slot would prevent the propagation of the light from the diode III to the associated phototransistor IIIa, thereby causing the subsequent comparator 56 to respond and to generate at the point 57 a card signal C which is fed to the D-input of a memory or flip-flop 58 shown in the lower right portion of FIG. 8 at the point 57. The clock pulse train for the D-flip-flop 58 is the $\overline{B}$ pulse train from the inverter 52. Accordingly, the Q-output of the flip-flop 58 carries a signal related to a logical 1 (in the present example) whereas it has a signal related to a logical 0 when the information carrier or coded card is absent.

It should be noted at this point that all of the logical states are merely exemplary indications and it is possible, as is well known to the person skilled in the art, to employ different logical relative switching states to obtain similar or identical overall functioning of the apparatus.

As seen in FIG. 9, approximately half-way in the negative-going portion of the pulse train $\overline{N}$, and as triggered by the edge of the pulse train T which is the inverted pulse train B, a test is made relative to the presence or absence of the information carrier. If this test is negative, i.e., no card is present, the gate 60 connected behind the last Schmitt trigger 29g of the oscillator 29 remains blocked via the line 59 and the E pulse train remains zero as illustrated in FIG. 9. This cycle is repeated periodically as shown in FIG. 9 until the test for the presence of an information carrier finally becomes positive due to the insertion of a coded card.

Timing Signals When An Information Carrier Is Present

The various pulse trains which occur when a card carrier is present are shown in FIG. 10. In accordance with the above discussion, the presence of a card causes a short pulse 61 within the pulse sequence E which endures as long as the corresponding pulse in the D pulse train lasts. This short pulse 61 and the E pulses which are present when an information carrier is inserted, are fed via the rapid-return line 29c to cause an almost instantaneous switching back of the A pulses compared with the much longer duration of these A pulses as shown in FIG. 9 if the signal is returned via the integrating sub-circuit consisting of the resistor 62 and the capacitor 63. Furthermore, the switchover of the $\overline{Q}$ output of the flip-flop 58 is passed via lines 64, 65 to the gate circuit 66 which thereby switches and causes the generation of the running pulses $\overline{R}$ which open the gates 67, 68, pass the inverter 69 and generate the high power actuation pulses LED at the point 70 from the combination of the pulse trains A and $\overline{B}$. These pulses are received at the point 70 in FIG. 7 and are passed through the amplifier chain 71, 73 and the connecting line 74 to the remaining light-emitting diodes I, II and IV which constitute a part of the reading head system while the light-emitting diode III receives a high-powered reading pulse LED from the associated amplifier 72.

The above-mentioned rapid signal return which shortens the A pulse also results in shortening the reading pulses LED whose associated pulse train is labeled $\overline{H}$ in FIG. 10.

Whenever a reading process is terminated, the entire cycle, including the actuation of the diode III with a first sensing pulse, is repeated.

Only when the presence of an information carrier is sensed do the diodes I–IV receive the high-powered reading pulses. The control pulse train for the diode III is labeled $\overline{N}'$ in FIG. 10 and it is composed of the sensing pulse $\overline{N}$ of FIG. 9 and the later occurring reading pulse LED corresponding to the pulse train $\overline{H}$.

In summary, the overall sequence of events is to sense the presence of an information carrier and subsequently to generate the high-powered reading pulses LED while at the same time switching to a higher operating frequency.

Activation Of Circuit Components For The Reading Cycle

When the overall circuit contains sub-groups or individual circuits which tend to consume relatively high current, it is advantageous to activate these latter circuits only if the presence of an information carrier has been determined. In the present exemplary embodiment, such a circuit is the program memory 37 in FIG. 8 which is embodied in bipolar technology and thus requires considerably more current than the CMOS circuitry and this circuit is activated only when needed. As will be seen in the pulse timing diagrams of FIG. 10, the reading pulse train $\overline{I}$ is composed of the pulses from the pulse trains A and C, which are fed via lines 76 and 77, respectively, to an AND gate 78 feeding a further AND gate 79 which releases the short reading pulses shown in FIG. 10 to the program storage only if its other input receives a signal indicating the presence of the information carrier from the information carrier indicating flip-flop 58. The PROM 37 is then activated by the amplifier 80. It will be appreciated that other power-intensive circuits might be actuated in this manner or that the actuating circuit can be omitted if the apparatus does not contain power-intensive circuit elements.

Read-Out Of Clock Information

Figure 6:
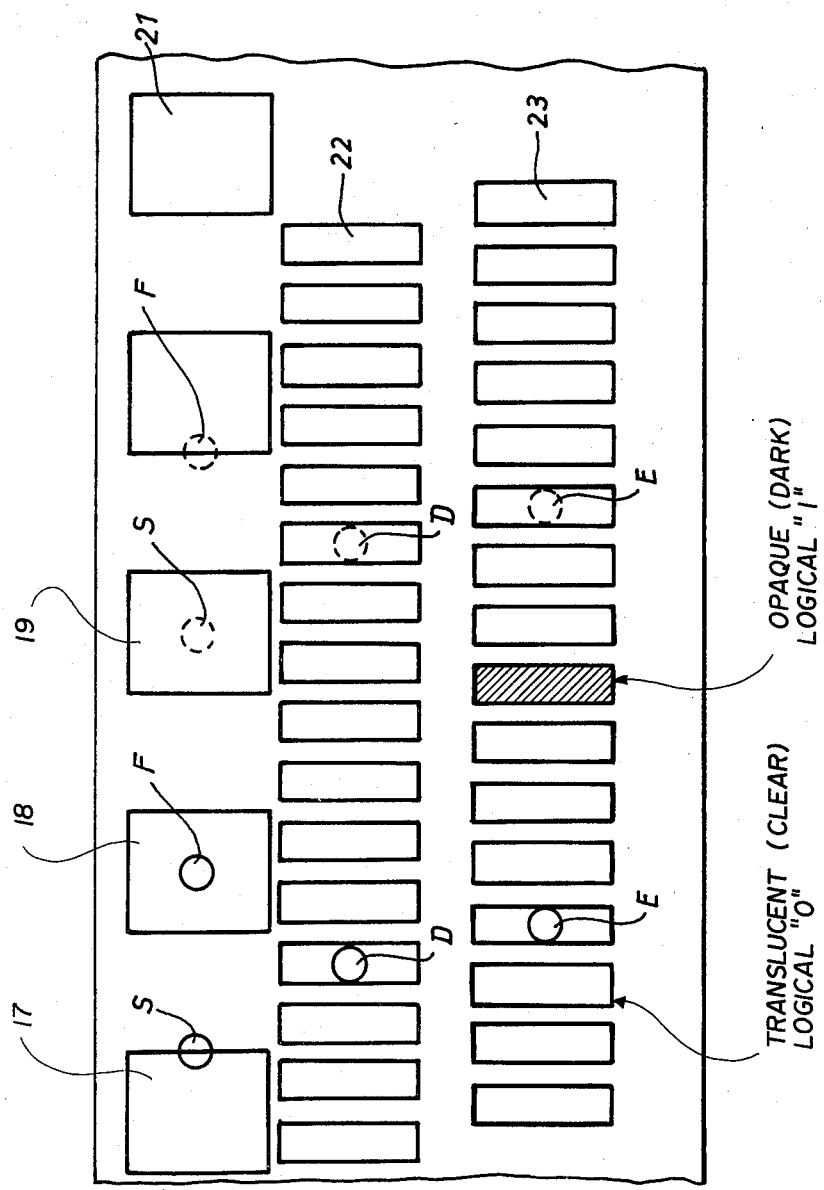
FIG. 6 is an illustration of the disposition of the coded tracks on an information carrier according to the invention, for example as disposed on an actuator of FIGS. 1a and 1b.

The illustration of FIG. 6 shows that the present exemplary embodiment, which is particularly suitable for dynamic pulsed reading, contains a separate clocking or timing track 21 associated with one or more data tracks 22, 23, etc. The exact number of clock tracks and data tracks is arbitrary, but the clock or timing track must be such as to yield enough usable alterations that each of the data bits present in the data tracks can actually be received by the reader. In the present exemplary embodiment of FIG. 6, only a single clock track is provided, which is read out by two reading heads, labeled F and S, respectively, in FIGS. 6 and 7. The other two reading heads, designated D and E, respectively, are used for reading the data on the data tracks. The clock track system has two main tasks and these are 1. the release of the data tracks for reading, once a clear determination has been made that a new bit status has been obtained during the insertion of the information carrier; and 2. to prevent reading when the above condition is not met, i.e., if the last position defined by the clock track and the associated reading heads S and F and, possibly, by any intermediate memory, all these constituting a "clock generator", has not changed or if a retrograde motion has been determined. Each of the data bits present in the data tracks must be associated with a particular different clock track configuration, whereupon it is fed to the program memory 37, permitting the latter to read the associated bit or bits on the data tracks.

For the purpose of simplification, the exemplary embodiment shown in FIG. 6 has a clock track design formed from alternating bright and dark fields which, together with the disposition of two reading heads F and S whose distance from one another is not equal to the separation of light and dark fields, results in the generation of a four-valued so-called period of the overall clock generator. For this reason, it is possible to move the information carrier backward during the reading process by as many as three clock track values until a fourth identical value is obtained and the system must admit failure and switch over to a malfunction indication.

To illustrate these events, let it be assumed that a relative displacement takes place between the clock track heads F and S and the clock track 21. Two possible positions of the reading heads F and S are shown in the figure, one of these being drawn in solid circles and the other shown in dashed circles. If the passages of the edges of the light and dark fields over the heads are considered as timing events, one obtains the following four states which define a "period" of the clock generator.

| | Reading Heads | |
|---|---|---|
| | F | S |
| a | 1 | 1 |
| b | 1 | 0 |
| c | 0 | 0 |
| d | 0 | 1 |

It will be further seen from FIG. 6 that, for each one of these states of the clock generator, the data track reading heads D and E are placed squarely above a light field or a dark field of the bit pattern in the tracks 22 and 23. In the representation of FIG. 6, all of the data fields are shown to be bright, although it will be appreciated that, in reality, a usable bit pattern would normally have a different and essentially arbitrary distribution of light and dark fields.

The pulse train C illustrated in FIG. 10 is used to generate an overall clock signal which is carried on line 85 in FIG. 8 to a point 86 which enters the circuit illustrated in FIG. 7 at a similar point 86 where it is applied to the clock inputs of two receiver flip-flops 87 and 88 which receive the output signals of comparator-amplifiers 89 and 56, associated, respectively, with the clock track reading heads F and S. The outputs 90 and 91, associated, respectively, with the Q outputs of the flip-flops 87 and 88, then carry clock track signals which are fed to inputs 1 and 2, respectively, of the program memory 37 illustrated in detail in FIG. 8.

Evaluation of Read-Out Clock Track Information

The valuation of the read-out clock track information is performed substantially by the previously mentioned program memory 37 and an associated status counter 35. For synchronized, rastered operation, the I pulse train formed from the A and C pulse trains and available at the output of the gate 78 is used as a general stepping pulse train which is carried via a line 92 to the clock inputs 93 and 94 of bistable flip-flops 96 and 95 whose purpose will be described below and which is further carried on line 92 to the clock input CL of the status counter 35. The status counter 35 alters its content to the next higher level provided that its EP input receives an appropriate enabling pulse via the line 97. The dimensions of the status counter 35 are such as to correspond to the number of bits in the data track, i.e., in the present case 16 bits. The outputs Q1, Q2, Q3, and Q4 of the status counter 35 are used to transmit the contents of the status counter 35 obtained by the stepping of the program memory 37 back into the latter memory 37 at appropriate address inputs 3, 4, 5 and 6. This address corresponds to the next expected bit pattern in the clock track information if the information carrier is inserted still further into the apparatus for a continuation of the reading of the data. The clock track information is fed to the inputs 1 and 2 of the program memory 37 from points 90 and 91 of the clock register 34 so that the program memory, i.e., the PROM 37, as it will be called below, waits for an appropriate coincidence and only thereafter will it provide appropriate stepping signals, data receipt signals or malfunction signals at its outputs 9, 10, 11 and 12. In other words, the PROM generates a nominal value for the next to-be-expected reading head signal a, b, c and d corresponding to the above-shown table and waits for this nominal value to be delivered to it by the status counter 35 in the form of an appropriate address. If this nominal combination does not appear at its inputs 1 and 2, the PROM 37 enters a holding status and prevents the stepping of the status counter 35 by placing a disabling signal at the enabling input EP of the status counter 35. Initially, let the case be considered in which a "proper", i.e., relatively uniform insertion of the information carrier is performed so that in the normal case the bit pattern generated from the four possible bit patterns of the clock track generator is present at the inputs 1 and 2 of the PROM 37, and that the PROM decides that a coincidence is occurring on the basis of the present address supplied by the status counter 35. In that case, its output 12 generates a shift signal which is fed to the D input of the synchronizing flip-flop 96 which receives the clock pulse through the line 93 for the purpose of rastering the information. The line 97 will then carry a shifting pulse S which is applied at 97 in FIG. 7 to the clock inputs $C_R$ of data registers 98, 99 which permit the data received from the comparators 100 and 101 associated with the reading heads D, E and which are present at the data inputs $D_R$ of the registers 98, 99 to be admitted to these registers. The shifting signal S occurs only once, because, at the same time, the PROM 37 causes the status counter 35 to step up by one step over the line 97, so that the address is changed and a coincidence between the clock track information which may still be present and the new address no longer occurs.

Prevention Of Reading During Retrograde Or Irregular Motions Of The Information Carrier It has already been noted that the four different states of which the clock track coding is capable permit the PROM 37 to allow as many as three changes of state during a reverse or retrograde motion of the information carrier and to remember them without causing the entire reading system to enter the failure or malfunction mode. Only when the retrograde motion reaches the fourth state again, which would correspond to the supposedly correct new state, does the PROM 37 give up its efforts and switch over to a failure mode. A submemory or marker flip-flop 95 is set by the output 11 of the PROM 37 if the expected clock bit pattern does not occur at its inputs 1 and 2 but rather another one which necessarily corresponds to a reverse or retrograde motion. In that case, the input 7 of the PROM 37 receives a locking signal from the Q output of the marker flip-flop 95 via the line 102, and, as long as this locking signal or retrograde signal is present, the PROM 37 rejects all clock bit patterns or combinations which do not correspond to the pattern which it had reached prior to the setting of the marker flip-flop 95. If a further retrograde motion results in a receipt of the expected clock track pattern while the locking signal is still present, then the outputs 9 and 10 of the PROM generate termination signals which are fed via lines 103a, 103b to gates 104 and 105, respectively. The gate 105, via the line 106', switches the L input of the status counter 35 to "load", which causes the latter to assume the counter status "full" at its output Q5, and this full signal is fed to gates 107 and 106. It will be appreciated that, due to the fact that the Q and $\overline{Q}$ outputs of the marker flip-flop 95 are coupled to the remaining inputs of the gates 107 and 106, respectively, while the marker flip-flop 95 is still set corresponding to the retrograde motion of the information carrier beyond the third permissible pattern, the output of the gate 106 generates an error signal F beyond the inverter 108, whereas, in the opposite case, i.e., if the marker flip-flop 95 has not been set, a termination signal E occurs which controls the orderly and normal termination of the reading operation.

If the information carrier is moved forward again prior to exceeding the clock bit combination which the PROM 37 is able to remember in retrograde motion, then the setting of the marker flip-flop 95 is nullified and the reading operation proceeds without having been affected by any jittering or retrograde motions of the information carrier. During this entire process, the PROM does not put out any shift signal S which alone would have made it possible to store any information from the reading heads D and E.

Malfunction Due To Excessive Delay

An important signal necessary for the function of the overall system is the running signal $\overline{R}$ present at the output of the gate 66. In one of the states of that gate 66, i.e., whenever the Q5 output of the status counter 35 applies a signal indicating a terminated reading process while at the same time the $\overline{Q}$ output of the flip-flop 58 applies a signal indicating the absence of an information carrier at the other input of the gate 66, the running signal $\overline{R}$ permits only low-power or low-current sensing pulses shown in the $\overline{N}$ pulse train of FIG. 9. The running signals $\overline{R}$ enter their other state if an information carrier is present while, at the same time, the status counter 35 is reset to zero or registers a continuing reading process. These running signals, which cause the release of the high-current LED pulses, are applied via a branching line 109 to one input of a gate 110, the other input of which receives the shift signal S from the flip-flop 96, and the output of the gate 110 goes to a timing circuit 111 which expires after a predetermined time interval if no further reading pulses are received, which is the case if the information carrier is not inserted further into the apparatus after an excessive period of time. In that case, the next clock pulse of the sequence $\overline{B}$, which corresponds to the T sequence of FIG. 9, sets a flip-flop 112 which applies to the input 15 of the PROM 37 a time expiration signal, causing the PROM 37 to generate output signals for terminating a reading process similar to the occurrence of a malfunction signal F. The timing circuit 111 may be of any suitable design and is represented by an RC element in the exemplary embodiment shown.

Transfer Of Data Track Information

In the exemplary embodiment illustrated, each data track is 16 bits long, although this number is arbitrary. Furthermore, a given clock track may be associated with any number of data tracks which are read out in parallel whenever the data track control generates an appropriate reading signal S. It is advantageous if the intermediate registers 98, 99 are double registers in which the contents of the first register are transferred by a transfer signal U either in parallel or in series into the second register after the eighth step, whereupon the first register receives the second half of the data track information. The interrogation and further processing of the data which are stored on the data track in the form of a bit pattern takes place via the output lines 113, i.e., eight bits at a time in parallel in overall serial interrogation. This manner of transfer is arbitrary in principle, as is the manner of treating the collected information from the data track. The data transfer can take place if the line 114 carries the termination signal E from the output of the gate 107, indicating a properly terminated reading process. The transfer signal U is formed from the combination of gates 115, 116 shown in the top left of FIG. 8, which receives a signal indicating the eighth step from the output Q1 of the status counter 35 via line 117, as well as receiving the clock signal via the line 85. The gate 116 is also shown to receive a strobe signal St on the line 118 coming from a further data processing system not illustrated.

Second Exemplary Embodiment Of The Apparatus

Figure 11:
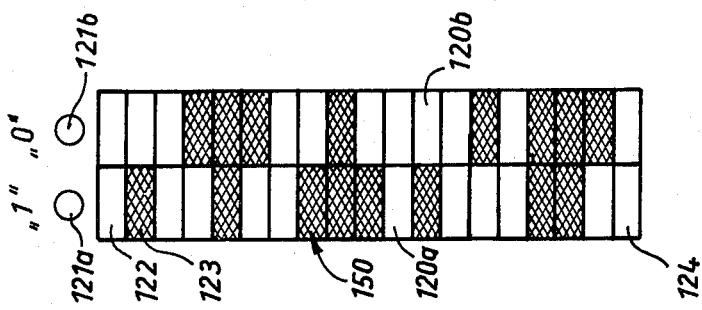
FIG. 11 illustrates a second exemplary embodiment of an information carrier having self-clocking code tracks.

The second exemplary embodiment of the information carrier shown in FIG. 11 illustrates a self-clocking code track having at least two, and generally only two, code tracks for a binary system. These two code tracks, respectively labeled 120a and 120b, are so formed that a change of the value takes place after each bit on one or the other of the two tracks 120a, 120b, but where a simultaneous change on both halves of the code track is not permitted. The basic principle of this exemplary embodiment is that one of the code tracks, for example, 120a, has the logical value 1, whereas the other code track, for example, 120b, has the logical value 0. Accordingly, when the possibility of self-clocking, independently of the insertion speed and including the possibility of stops and even reverse motion, is taken into account, the customary 16 bits on each code track result in an overall number of 65,536 possible code patterns. Each of the code tracks 120a, 120b has an associated reading head 121a, 121b. In the exemplary embodiment, the overall coded and stored information corresponds to a particular number or digit which is tested by an evaluation circuit, to be further discussed with respect to FIGS. 12 and 13, for generating appropriate control signals, for example, for opening a lock. In such a case, the information carrier which carries the two code tracks 120a, 120b represents a kind of key which might also be inserted into the locked opening carrying the reading heads 121a, 121b in the opposite orientation.

As already pointed out in the exemplary embodiment shown, a change must take place in either the right or left code track 120a, 120b after each bit. By sensing the occurrence of positive- or negative-going edges of the pulses generated by the reading heads, it is possible to realize the principle of self-clocking. Each pulse edge signal is a clock signal and can be used, for example, for shifting a shift register which receives the detected data and may reproduce it, for example, in parallel. The shift register is filled with the bit pattern derived from the two code tracks by assigning to each change in the parity of the left code track the status of a logical 1, while assigning to each parity change in the right code track 120b the status of a logical 0. The information carrier illustrated in FIG. 11 also includes a starting bit 122 followed by a directional bit 123 for insuring that even when the information carrier (key, coding card, etc.) is inserted in the opposite direction, the coded information will be read out in the proper sense. At the end of the tracks there is provided a stop bit 124.

The starting bit 122, which in this case consists of a bright segment on both tracks, permits the reading apparatus to anticipate a coded track. The directional bit 123 indicates the direction in which the code is to be read. The directional bit has a bright segment on one track and a dark segment on the other, and the dark segment may be associated, for example, with the code track 120a, which has the value of a logical 1.

The embodiment of the data carrier shown in FIG. 11 may be used in association with many of the circuit systems illustrated in FIGS. 4–10 and described above. Furthermore, in this embodiment, the coded information including the clock information may be read out in pulsed operation. However, a standby operation may be maintained by the generation of very weak sensor pulses as described above, and to shift to a continuous reading operation which will be explained below.

Continuous Readout For The Second Embodiment

Figure 12:
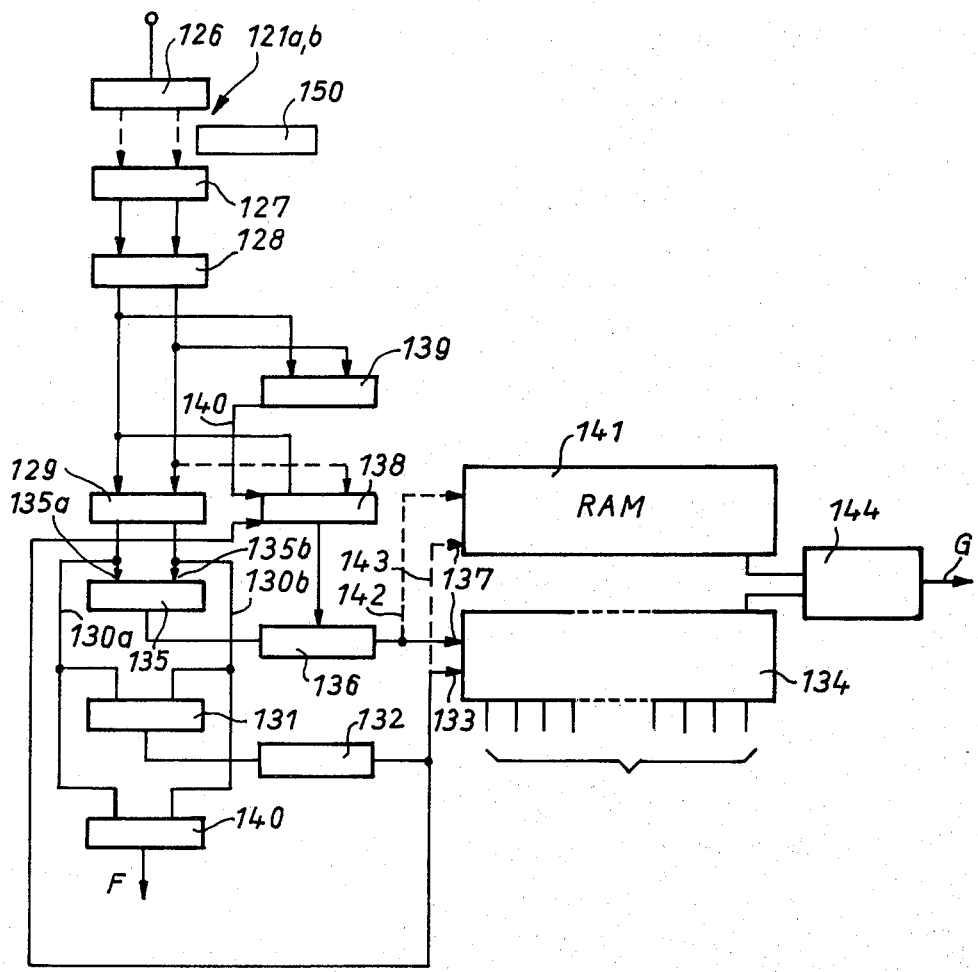
FIG. 12 is a block diagram of a first embodiment for a processor circuit associated with the information carrier of FIG. 10.

A first variant of the apparatus for reading the code carrier of FIG. 11 is illustrated in FIG. 12 and is seen to include the two aforementioned reading heads 121a, 121b consisting of two light sources 126 and two light receivers 127, respectively embodied as light-emitting diodes and phototransistors. The signals from the two light receivers 127 are preamplified at 128 and pass to edge detectors 129, which recognize a change in signal levels, i.e., a change from light to dark and vice versa in the two code tracks. The edge detectors generate output signals which are fed via lines 130a, 130b to an OR gate 131 and together they form a clock pulse sequence which permits the evaluation of the data bits. The clock pulse sequence is transmitted via a delay member 132 to the transfer input 133 of a register 134 that stores the data pattern. The data are received by an intermediate register 135, constituted by an RS flip-flop in the present embodiment, and so connected that it changes its status only if a previous triggering at one of the inputs 135a, 135b is followed by a triggering at the other input. Any sequential trigger pulses at the same input result in no switching of the flip-flop 135. It will be appreciated that the clock pulse sequence automatically shifts the shift register 134 and, depending on the distribution of data bits on the two code tracks 120a, 120b, the output of the intermediate register 135 constitutes the logical states which result from the distribution of bright and dark fields in the code tracks. These signals are fed via a further gate, preferably an exclusive OR gate 136, to the data input 137 of the shift register 134. It is the property of the exclusive OR gate to change the parity or value of the output signal from the intermediate register 135, while addressing a directional register 138 which is set by the first directional bit 123 on the code carrier 120. Depending on which of the tracks 120a, 120b carries the directional bit, the output signal of the directional register 138 is changed. The register 138 may be a simple flip-flop, and its effect is to cause the correct evaluation of the distribution of light and dark fields, i.e., as a logical 0 or a logical 1, to be fed into the shift register 134 in accordance with the output of the exclusive OR gate 136.

In FIG. 11, the code pattern from the data bits generated by the distribution of light and dark fields is shown adjacent to the code tracks.

The directional register 138 is released in the first instance by a start register 139 via a line 140 whenever the start register 139, which may be a simple gate, recognizes the starting bit 122 on both tracks of the data carrier. Similarly, the starting register 139 may take over the transfer of the read-out data information, the resetting of the memory and the preparation for the next reading operation after the termination of the reading process and the arrival of the stop bit 124. In general, it should be pointed out that the basic principle illustrated in the exemplary embodiment of FIG. 12 is intended only to explain the overall design in principle, and the person skilled in the art is able to use the information contained in the previous detailed circuits for providing a system suitable for the second exemplary embodiment of the data carrier according to FIG. 11. The circuit of FIG. 12 may include a timing circuit 140 which generates a malfunction signal when no edge signal is present for a predetermined amount of time.

In a particularly preferred version of the apparatus, it is possible to avoid preliminary storage of the bit pattern carried by the information carrier and to use the first insertion of the information carrier to set the reading device to the specific bit pattern exhibited by that particular information carrier in a permanent way. For this purpose, the circuit of FIG. 12 includes a so-called random access memory (RAM) which receives both data and clock signals during a first reading via connecting lines 142, 143. The memory 141 retains these data permanently, unless a special reset circuit is activated. A coincidence circuit 144 associated with the shift register 134 and the RAM 141 serves to indicate the recognition of the correct data bits by comparing the contents of the shift register 134 with those of the memory 141 after the arrival of the stop bit and to generate an acceptance signal G when coincidence is obtained.

Data Readout In Pulsed Operation

If the exemplary embodiments of FIGS. 11 and 12 are to be used for reading data in pulsed operation of the reading heads, which is a manner of operation that has many advantages, especially resulting in increased life and low current consumption, it is only required to supply a supplementary clock generator 145, shown in FIG. 13, which may be embodied, for example, in the manner of the multi-phase oscillator 29 of the first exemplary embodiment and which cooperates in similar manner with the pulse selection processor 33. The pulse generator 145 applies appropriate pulses to the reading head system via the line 146, while a second line 147 leads to an intermediate storage 148 required to perform pulse operation. The intermediate storage, which may consist of two flip-flops, each assigned to receiving information from one of the two coded tracks, generates pulse trains at its outputs 148a, 148b which may be used by the edge detectors 129'. Each of the flip-flops in the intermediate storage 148 is triggered into its respective second state by the change of signals at its input. The remaining circuit elements of the variant of FIG. 13 are not discussed in further detail, because they correspond substantially to those in the embodiment of FIG. 12 and carry the same reference numerals, except for a prime symbol. The pulses carried by the line 147 to the intermediate storage 148 and to the starting register 139' cause the transfer of the information present at the data inputs when that information has changed. It should be noted that the information carrier in the illustrations of FIGS. 12 and 13 is identified by the numeral 150 and may be, for example, an identification card, a coded card, a key, or the like.

A conspicuous advantage of the apparatus described by the foregoing specification is that individual circuit groups and even large, coherent electronic components which cooperate functionally may also be replaced by an appropriately programmed microprocessor or a similar device, and the use of such a microprocessor is considered to be completely within the frame and scope of the present invention.

The foregoing description relates to merely preferred exemplary embodiments and variants of the present invention, it being understood that other embodiments are possible within the spirit and scope of the invention.

What is claimed and desired to be secured by Letters Patent of the United States is:

1. In an apparatus for actuating a locking device, a security device and the like, said apparatus including an actuator element containing information related to the authorized actuation of said locking device and the like, and further including receiver means for receiving said actuator element and containing guide means for guiding said actuator element along a predetermined longitudinal path and information retrieving means for retrieving said information presented to said retrieving means during movement of the actuator element along said longitudinal path, said apparatus further comprising means to process the information retrieved from said actuator element, the improvement wherein:

said actuator element is a key provided with two longitudinal tracks of coded data, each of which is composed of a sequence of uniformly spaced, different indicia, said data being carried in a non-mechanical manner, said two tracks containing the information to be processed by said apparatus and at the said time constituting a clock track for the apparatus, the code tracks being so disposed that for each data step, one or the other of the bits in said code tracks will change, the change thereof constituting the occurrence of a logical state (1) for bit changes in one of the tracks and a logical state (0) for a bit change in the other track, whereby the occurrence of bit changes in one or the other tracks is interpreted as a sequence of logical states constituting a clock sequence;

each of said coded tracks is associated with a reading assembly (121a, 121b) whose output signals are fed to detectors (129) for detecting changes in the output signals of said reading assemblies and generating output signals that are combined in a gate circuit (131) and constitute the shifting cycle for the shift input of a shift register (134, 134');

the output signals of the detectors (129) are provided to switching inputs of a storage circuit (135) whose output is connected to the data input (137) of the shift register (134), whereby the bit pattern which corresponds to the clock sequence generated by the bit pattern itself is received in the shift register (134, 134'); and a coincidence circuit (144) determines the coincidence of the contents of the shift register (134) and the contents of a memory holding predetermined shift clock cycle and data information.

2. An apparatus according to claim 1, wherein said coded track is a sequence of transparent and non-transparent fields which are covered on both sides with material permitting the passage of infrared radiation only.

3. An apparatus as defined by claim 1, wherein the initial data bits of the two code tracks (120a, 120b) constitute an initial directional bit (123) and wherein a change of the value of successive bits in one of the tracks constitutes a change of the predetermined logical state assigned to that track; whereby the data on said two tracks may be read out independently of the orientation of said actuator element.

4. An apparatus as defined by claim 3, further comprising a starting bit common to both code tracks followed by a stop bit (124) located at the end of the information-containing data, the stop bit (124) also being associated with both code tracks.

5. An apparatus as defined by claim 1, further comprising one or more additional code tracks, and wherein each change in one of the totality of coded tracks constitutes a change of the basic code, (ternary code, quaternary code, etc.).

6. An apparatus as defined by claim 1, wherein the direction of motion of said actuator element is determined by a directional register (138, 138') triggered by the directional bit (123) on said actuator element, the output of said directional register (138, 138') being provided to an inverting gate (136) whose input receives information from said data register (135) and whose output is connected to the data input (137) of said shift register (134, 134').

7. An apparatus as defined by claim 6, wherein the output signals of the two detectors (129) are used to generate the shift cycle for the shifting input (133) of the shift register (134) which is applied thereto via a delay circuit (132).

8. An apparatus as defined by claim 7, further comprising a time monitor circuit (140) triggered by each of the output signals of said detectors (129), for generating a malfunction signal (F) when the period between detected changes in the output signals of said reading assemblies increases beyond a predetermined limit.

9. An apparatus as defined by claim 8, wherein said memory is a programmable memory (141) connected to the outputs of the two detectors (129), the time monitor circuit (140), and the data register (135), which generate the shift clock cycle and the data information so that, during an initial insertion of the actuator element, the read out coded information is permanently received in said memory (141) and wherein, during any subsequent insertion of the actuator element (150), said coincidence circuit (144) determines the coincidence of the contents of said memory (141) with the contents of said shift register (134).

10. An apparatus as defined by claim 1, further comprising a clock generator (145) for generating control pulses used to actuate the reading assemblies (126', 127') and other processing circuits for performing the pulsed read-out of data bits and clock information from the two coded tracks (120a, 120b) of the information carrier (150) and further comprising an intermediate memory (148) connected ahead of said detectors (129') for receiving the read out information.

11. An apparatus according to claim 1, wherein, during standby operation, at least one reading assembly is operated at long time intervals with short low power sensing pulses whereas in data retrieval operation the totality of reading assemblies is provided with power pulses whose amplitude is substantially higher than that applied during standby operation and substantially higher than the maximum power permissible during continuous operation, the frequency of said power pulses being equal to the maximum reading speed.

12. In an apparatus for actuating a locking device, a security device and the like, said apparatus including an actuator element containing information related to the authorized actuation of said locking device and the like, and further including receiver means for receiving said actuator element and containing data processing means to retrieve and process the information on said actuator element, the improvement which comprises:

said actuator element is provided with a plurality of longitudinally extending tracks of first and second types of pattern areas or bits, carried in a non-mechanical manner without alteration of the silhouette of the actuator element, each of said tracks having associated with it at least one reading assembly, said plurality of tracks including at least one data track containing stored data bits and at least one clock track containing a plurality of adjacent alternately arranged first and second types of pattern areas, each pattern area of said at least one clock track constituting a clock bit, each clock bit having the same longitudinal dimension as every other clock bit, said at least one clock track having associated therewith at least two longitudinally spaced clock track reading assemblies, each generating a clock bit signal corresponding to an adjacent one of said clock bits, said clock bit signals together constituting a clock sequence of different clock bit patterns, the longitudinal distance between adjacent clock track reading assemblies exceeding said clock bit longitudinal dimension and being preselected so that, as said actuator element is moved longitudinally with respect to said clock track reading assemblies for a distance equal to at least twice said clock bit longitudinal dimension, said clock track reading assemblies generate a clock sequence having at least four different clock bit patterns corresponding to equal portions of the distance said actuator element is moved relative to said apparatus, each data bit of each data track being associated with a particular clock bit pattern of said clock sequence; and said data processing means includes a memory holding a first predetermined clock sequence program corresponding to a first clock sequence generated by said clock track reading assemblies as said actuator element is inserted into said receiver means and moved longitudinally in a first direction; and said data processing means further includes data track evaluating means and comparison means for comparing the clock sequence generated by said clock track reading assemblies with said first predetermined clock sequence program, said comparison means delivering a disabling signal to said data track evaluating means whenever the clock sequence generated by said clock track reading assemblies differs from said first predetermined clock sequence.

13. An apparatus as defined by claim 12, further comprising an actuator element recognition register (30) for distinguishing, by means of low power sensing pulses applied preferably to only a single reading assembly, between a standby operation and a reading operation employing relatively high powered reading pulses or continuous powering of all reading assemblies, said actuator element recognition register (30) providing an output pulse applied to a multi-phase oscillator (29) which generates a plurality of differing control pulse trains, and means for performing said reading operation at a higher pulse frequency than said standby operation and means for high power reading pulses (LED) to follow a sensing pulse which detects the presence of said actuator element.

14. An apparatus as defined by claim 13, wherein the output pulse of said actuator element recognition register (30) is applied to a gate (79) for generating short actuation power pulses for those circuit groups (Program memory 37) requiring relatively high power during continuous operation and wherein said gate (79) receives short clock pulses (Ī) from said multi-phase oscillator (29).

15. An apparatus as defined by claim 13, further comprising a clock register (34) for receiving the pulses generated by said clock track, said clock register (34) being connected to control a program memory (37), having associated therewith a status counter (35), said program memory (37) causing said status counter (35) to advance by one step upon the receipt of a new clock pulse causing a renewed reading of data, said status counter (35) generating an address for said program memory (37), said address constituting information regarding the nature of the next clock track pattern to be expected in the next following reading operation in orderly manipulation of said actuator element with respect to said apparatus.

16. An apparatus as defined by claim 15, further comprising a status register (31) consisting of a plurality of storage units (95, 96) said status register being connected to the outputs of said program memory (37) and being clock pulse-controlled by short clock pulses (Ī) generated by said multi-phase oscillator (29), said status register (31) causing shifting pulses (S) to be applied to a shift register consisting of sub-registers (98,99) connected behind the reading assemblies (D,E), whenever said actuator element (150) is determined to be present.

17. An apparatus as defined by claim 16, wherein said status register includes a marker memory (95) which is set by said program memory (37) whenever said program memory (37) receives a clock pattern which does not correspond to the expected clock pattern and implying retrograde motion of said actuator element with respect to said apparatus; whereby the absence of a shifting pulse (S) prevents the occurrence of a read-out of the corresponding information on said actuator element.

18. An apparatus as defined by claim 16, wherein the assembly consisting of said program memory (37) and said status counter (35) contains a stored pulse sequence program permitting said program memory (37) to recognize if the clock bit pattern to be expected during correct insertion of said actuator element has been read or if an interruption of the motion or retrograde motion of said actuator element has occurred.

19. An apparatus as defined by claim 18, wherein the clock track (21) of said data carrier is a simple alternating brightdark pattern, and wherein, when said actuator element is moved in retrograde motion, said marker register (95) is set, thereby permitting three backward clock steps of said actuator element without causing a determination of malfunction; whereby, when a clock bit pattern is subsequently received which corresponds to the clock bit pattern which was originally expected, and said marker flip-flop (95) is set, a malfunction is determined.

20. An apparatus as defined by claim 19, wherein, when a malfunction is detected, said program memory (37) provides to said status counter (35) a control pulse causing said status counter (35) to register a full counter, said control pulse also being applied simultaneously to two gate circuits (106, 107); whereby when said marker flip-flop (95) is set, a malfunction signal (F) is generated whereas when said marker flip-flop (95) is not set, and said status counter is stepped in proper fashion, there is generated a reading termination pulse (E).

21. An apparatus as defined by claim 20, further comprising a time monitor circuit (41) for monitoring the period occurring between shift pulses (S) which, when a predetermined period thereof is exceeded, generates a signal for said program memory (37) to produce an error signal.

22. An apparatus as defined by claim 21, further comprising gate circuits (78, 79, 110, 104, 105, 66, 106, 107, 115, 116) and clock registers (112, 58, 95, 96, 34) for synchronizing the frequency-altered output pulse trains (A,B,C,D) produced by said multi-phase oscillator (29) during the presence of said actuator element with the control pulse trains (E, N̄, T, H̄, Ī) derived therefrom so as to force-synchronize the pulse-operated reading and standby operation, thereby preventing a repetition of the read-out of identical information when the data carrier is moved slowly with respect to the apparatus and the pulse repetition rate is rapid.

23. An apparatus according to claim 12, wherein each track of said plurality of tracks is a sequence of transparent and non-transparent fields which are covered on both sides with material permitting the passage of infrared radiation only.

24. An opto-electronic apparatus for actuating a locking device, a security device and the like, for reading coded data from a data carrier that may be moved with respect to said apparatus for presentation thereto of the data which is represented by patterns of areas, each area being either transparent (bright) or opaque (dark) to the passage of radiation, and said apparatus including at least one reading assembly consisting of a source of radiation and an associated receiver of radiation and further including means for guiding said data carrier relative to said at least one reading assembly so that radiation from said source may interact with said pattern area to be received by said at least one radiation receiver and said apparatus still further including electronic data processing means for evaluating the data on said data carrier and wherein the improvement comprises:

means for applying to said reading assemblies and to said electronic data processing means operating pulses of different character, defining a standby operation and a reading operation, and wherein, during standby operation, at least one reading assembly receives short, low power sensing pulses at long intervals whereas, during reading operation, the totality of reading assemblies receives high power pulses whose amplitudes are substantially higher than those of the sensing pulses applied during standby operation and also substantially higher than the maximum power permissible during continuous operation of said reading assemblies, the frequency of said power pulses being equal to the maximum reading speed.

25. An apparatus according to claim 24, including means for shutting down during standby operation portions of said data processing means requiring substantial power and for applying thereto clock pulses during the reading operation, the duration of said clock pulses being only a fraction of said reading pulses.

26. An apparatus as defined by claim 25, wherein the switchover from standby operation to reading operation takes place automatically in dependence on the absence of a clock pulse at at least one of said reading assemblies (S).

27. An apparatus to claim 25, wherein said electronic data processing means includes a memory containing a permanent pulse sequence program and wherein said reading assembly includes a clock track reader having two reading heads (F,S) and wherein said data carrier is provided with a special clock track consisting of a sequence of light and dark fields, the distance between the reading heads in said clock reading assembly (F,S) being 1.5 times as large as the separation of light and dark fields in said special clock track; whereby the clock sequence retrieved from said data carrier is compared with the stored clock sequence for the prevention of insertion errors and the recognition of false data carriers.

28. An apparatus as defined by claim 27, wherein the stored clock sequence program includes one pulse sequence corresponding to the correct insertion movement of said code carrier in said apparatus and a second pulse sequence related to a correct removal motion of said data carrier from said apparatus and further contains stored pulse sequences identifying the acceptability of the received pulse trains with respect to the data processing means as regards the type of pulse, the number of pulses and the separation of pulses.

29. An apparatus as defined by claim 24, including means for returning the reading assemblies and the data processing means to standby operation immediately after the termination of a reading operation and also immediately after the recognition of a reading error.

30. An apparatus for actuating a locking device, a security device, and the like, which comprises:

an actuator key which includes two longitudinal tracks of coded data related to the authorized actuation of said locking device and the like, said data being carried by said key in a non-mechanical manner without alteration of the silhouette of said key, each code track being composed of a sequence of first and second types of indicia or bits, the bits of one code track being associated respectively with the bits of the other code track and constituting a sequence of pairs of associated bits, the bits of the two code tracks being disposed so that one or the other of the two bits of each successive pair of associated bits is a different type than those of the bit of the same code track of the preceding pair of associated bits;

receiver means for receiving said key, containing guide means for defining a longitudinal path of travel of said key within said receiver means, and two reading means disposed respectively along the longitudinal paths of travel of said two code tracks for generating output signals indicating the types of the bits being traversed by the two reading means during longitudinal movement of the key within the receiver means, the two reading means being disposed so that the two bits of each pair of associated bits are simultaneously is interpreted as a sequence of logical states constituting a clock sequence for the apparatus;

a storage circuit having two switching inputs connected to receive the output signals of the two detector means, respectively, and an output which is connected to the data input of the shift register, wherein the bit pattern or disposition on the key which corresponds to the clock sequence generated by the bit pattern itself is received in the shift register;

memory means for storing predetermined shift clock cycle and data information; and coincidence circuit means for determining the coincidence of the contents of the shift register and the contents of the memory means, said coincidence circuit means generating an acceptance signal to operate said locking device, security device and the like when coincidence is obtained;

whereby the two code tracks not only contain the information to be processed by said apparatus but also constitute a clock track for the apparatus.

* * * * *